Feb. 11, 1936.  E. W. SCHANTZ  2,030,406

TOOL FOR MAKING SNAP FASTENERS FOR BAG FRAMES

Filed June 26, 1934  2 Sheets-Sheet 1

INVENTOR
Edward W. Schantz,
BY
George D. Richards
ATTORNEY

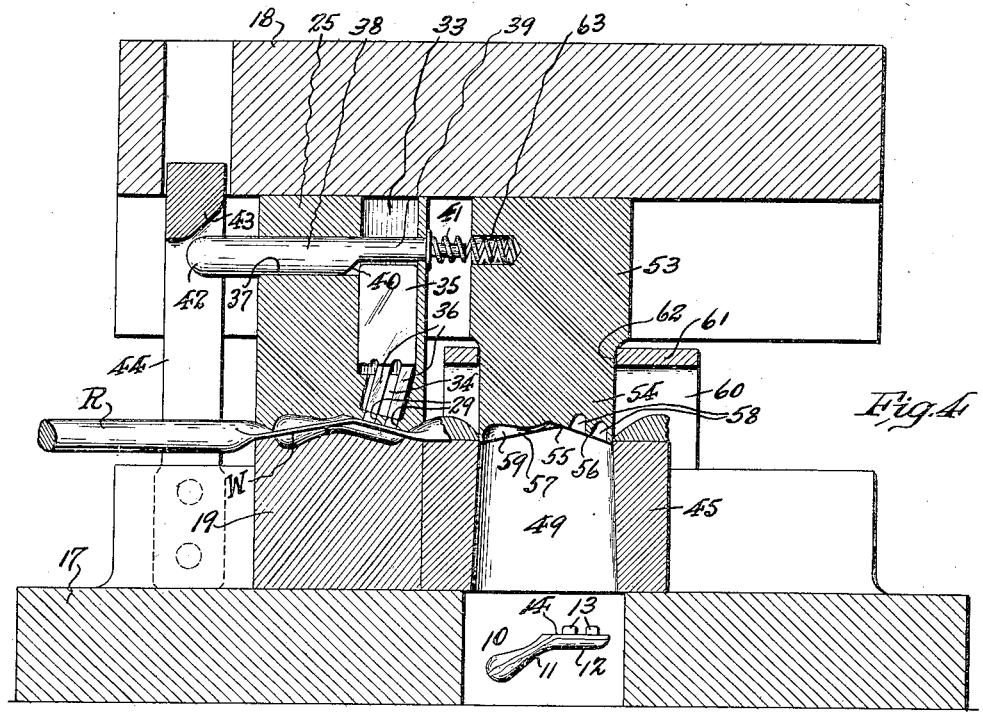

Patented Feb. 11, 1936

2,030,406

UNITED STATES PATENT OFFICE 2,030,406

TOOL FOR MAKING SNAP FASTENERS FOR BAG FRAMES

Edward W. Schantz, Newark, N. J.

Application June 26, 1934, Serial No. 732,395

6 Claims. (Cl. 29—34)

This invention relates to snap fastener or catch means for purse and bag frames; and the invention has reference, more particularly, to improvements in that class of fasteners for purses, bags, and the like, known as "ball fasteners", and to a novel method and novel tools for producing, from a base material comprising iron or soft steel stock, the improved ball fastener as a complete solid integral element.

So far as known, solid ball fasteners of the kind here involved have heretofore been produced only in brass by a somewhat complicated method, whereby hard brass stock had to be first turned on a lathe or screw machine and cut off to form a blank. This blank was thereupon annealed, and then, by means of a press and suitable dies, its head was bent to desired angle and a shank therefor swaged to desired shape and formed to provide the requisite riveting lugs in connection therewith; after which the ball fastener had to be tumbled, cleaned and plated.

In accordance with the present invention, a wire or rod of iron or soft steel is fed from a roll or other suitable source of supply directly to a novel set of dies actuated by a press, whereby, in one operation, the ball fastener is fully shaped with head, neck, shank or base and riveting lugs by a single blow; being then trimmed ready to be tumbled and thereafter plated, and thus completely made ready for application to the frame upon which it is to serve. These relatively simple and rapid operations eliminate all necessity for initially turning up and cutting off blanks, as well as the requirement of annealing such blanks preparatory to shaping by dies, and consequently an exceedingly rapid and economical production of the fasteners in one-piece solid form from a comparatively cheap base of iron or soft steel is afforded by this invention.

Other objects of this invention, not at this time more particularly enumerated, will be understood from the following detailed description of the same.

This invention is illustrated in and by the accompanying drawings, in which:

Fig. 4 is a similar view showing the dies as operated to produce and shape the ball fastener.

Figs. 5 and 6 are respectively face views of the cooperating lower and upper shaping dies; and Figs. 7 and 8 are respectively face views of the cooperating lower and upper trimming dies.

Similar characters of reference are employed in the above described views, to indicate corresponding parts.

Figure 2:
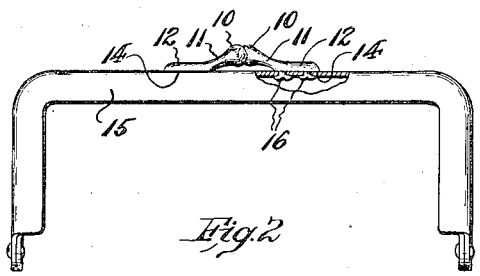
Fig. 2 is a face view of a bag frame equipped with the solid ball fasteners of the kind with which this invention deals and as produced according to said invention; this view being drawn on a reduced scale.

Referring to said drawings, the ball fastener in finished form as a solid integral or one-piece element, comprises a head 10, a neck 11, a base 12, and riveting lugs 13 projecting from and at right angles to the plane of the flat bottom 14 of said base 12. The head and neck of the ball fastener may be given various detail contours or shapes, and are not necessarily limited to the specific proportions and shapes shown in the accompanying drawings.

Figure 1:
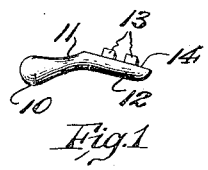
Fig. 1 is a side view of the solid ball fastening per se.
Figure 3:
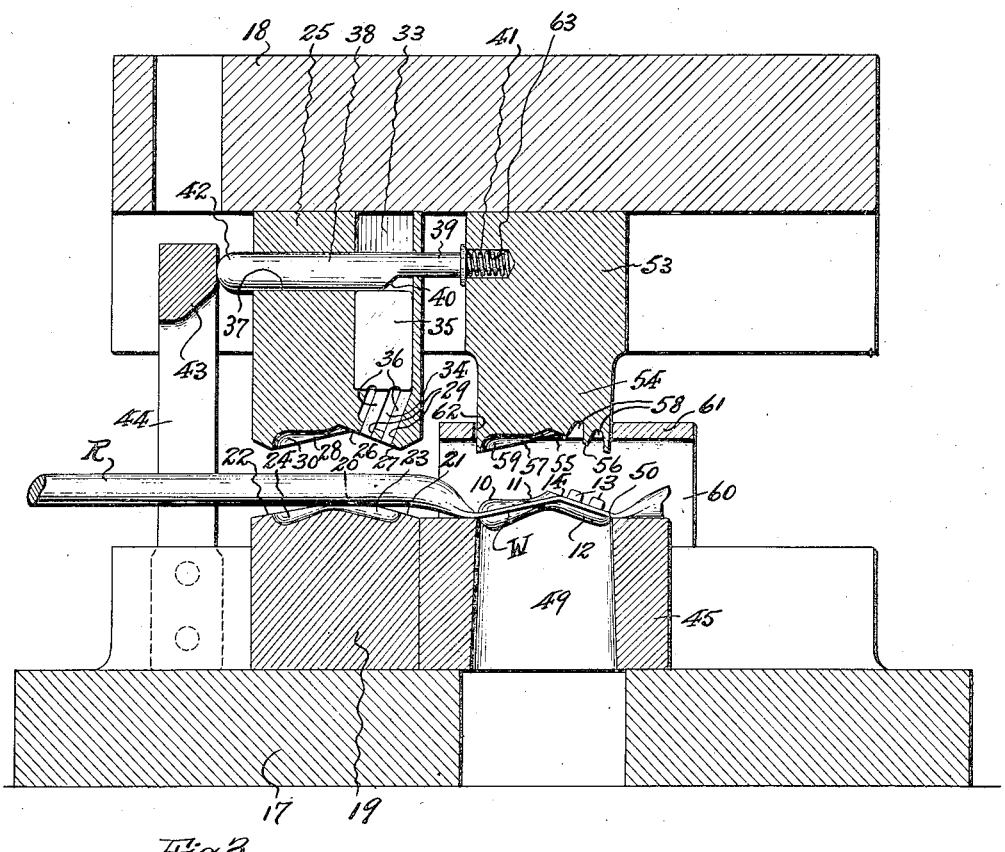
Fig. 3 is a vertical longitudinal section through the novel dies of this invention, with the latter disposed in position preparatory to the operation of shaping the stock to form the ball fasteners.

When applied to a purse or bag frame 15, the ball fasteners are employed in pairs, one on each frame section with their heads 10 opposed so as to snap past each other and overlap to thereby retain the frame sections in closed together relation. The fasteners are secured to the respective frame sections by inserting the riveting lugs 13 through the walls of the latter, with the bottom 14 of the base 12 seated flatly on an exterior surface of the frame section. When thus positioned, the inwardly projecting free ends of the riveting lugs are crushed or clinched over the interior surface of the frame section wall, as shown at 16 in Fig. 1.

The tools for producing the ball fastener are adapted to be mounted in a suitable power press having a die bed 17, and a chuck 18 which is vertically reciprocable above said die bed.

Suitably affixed to the die bed 17 is a lower shaping die, comprising a body or block 19. The upper face of said body or block 19 is provided with a longitudinal apex 20 intermediate its sides, said apex 20 constituting a high point from which extend laterally in opposite directions descending angular die faces comprising a right-hand die face 21 and a left-hand die face 22. Said die faces 21 and 22 are thus angularly related according to the desired degree of angular projection at which the longitudinal axis of the head and neck of the fastener is to be disposed relative to the bottom plane of the base of the latter. Countersunk in the right-hand die face 21 is the complete fastener base die cavity 23, and countersunk in the left-hand die face 22 is a top half head and neck die cavity 24 which meets at the apex of said die faces in communication with said base die cavity 23.

Suitably affixed to the chuck 18, in cooperative vertical alignment with said lower shaping die, is an upper shaping die, comprising a body or block 25. The lower face of said body or block 25 is provided with an inverted apex 26 which is coincidental to the apex 20 of said lower shaping die, said inverted apex constituting a low point from which extend laterally in opposite directions ascending angular die faces comprising a right-hand die face 27 and a left-hand die face 28 corresponding in relative angularity to the relative angularity of the die faces 21 and 22 of said lower shaping die. Said right-hand die face 27, when the lower and upper shaping dies are engaged in operative meeting relation, bounds the bottom plane of the base of the fastener being shaped. Countersunk in said right-hand die face 27 are riveting lug die cavities 29, and countersunk in the left-hand die face 28 is a bottom half head and neck die cavity 30.

The upper shaping die is provided with downwardly projecting guide pins or dowels 31 which are received and reciprocate in corresponding guideways or openings 32 provided in said lower shaping die, thus maintaining said dies in co-operative alignment during operation thereof, so as to assure registration of their respective die cavities when said dies are brought together.

In connection with said upper shaping die there is provided an automatically actuated knock-out means for removing a shaped fastener and especially the riveting lugs thereof from the cavities in which they are formed, when said upper shaping die is raised after a fastener forming or shaping operation. This knock-out means comprises a vertical slideway 33 having an intermediate chamber 34 above and communicating with the interior ends of said lug die cavities 29. Vertically movable in said slideway 33 is a plug 35 having at its lower end downwardly projected knock-out pins 36 which extend through the chamber 34, so that their free ends register slidably with and in said lug die cavities 29. Transversely slidable in a guideway 37, which intersects said slideway 33 above the plug 35, is a cam pin 38 having a reduced end portion 39 to thereby form at its underside a depressor cam 40 engageable with the upper end of said plug 35. The reduced end of said cam pin 38 is suitably engaged by a thrust spring 41 which yieldably thrusts the opposite free end 42 of said cam pin into operative engagement with a stationary control cam 43, which is supported on a post 44 from the die bed 17. When the upper shaping die is raised to initial separated relation to said lower shaping die, said free end 42 of the cam pin 38 is carried into engagement with said stationary control cam 43, whereby the cam pin is moved from left to right, thus thrusting its depressor cam 40 against the top of the plug 35 so as to cause the latter to move downwardly in the slideway 33 thereby to project the knock-out pins 36 through the riveting lug cavities 29 and thus ejecting therefrom the lug formations and also stripping from the raised upper shaping die a fastener element formed by a previous operative downward movement of said upper shaping die relative to said lower shaping die.

Suitably affixed to the die bed 17 is a lower trimming die, comprising a body or block 45. The upper face of said body or block 45 is pivoted with a longitudinal apex 46 intermediate its sides, said apex constituting a high point from which extend laterally in opposite directions descending angular right and left hand faces 47 and 48 corresponding to the angular divergence of the longitudinal axis of the fastener element as formed by the above described shaping dies. Extending vertically through said body or block 45 is a passage way or drop out hatch 49, which terminates at its upper extremity at the faces 47—48 in cutting edges 50 conforming in shape to the transverse peripheral outline of the fastener element as formed by the aforesaid shaping dies. The marginal portions 51 of the cutting edges 50 are downwardly and outwardly chamfered below the planes of the faces 47—48, which faces are routed out as at 52, to provide for such formation.

Suitably affixed to the chuck 18, in cooperative vertical alignment with said lower trimming die, is a trimming punch. This trimming punch comprises a base 53 having at its lower end a downwardly projecting punch member 54, the extremity of which conforms in peripheral outline to the transverse peripheral outline of the fastener element as formed by the aforesaid shaping dies. The bottom face of said punch member is provided with an inverted apex 55 which is coincidental to the apex 46 of the lower trimming die, said inverted apex constituting a low point from which extend laterally in opposite directions ascending angular faces 56 and 57 corresponding to the faces 47—48 of said trimming die. Transversely indenting the right hand face 56 are clearance grooves or channels 58 to receive the riveting lugs 13 of the formed fastener element when the punch member forces the latter against the trimming die. Formed in the left hand face 57 is a seating cavity 59 to receive the head 10 and neck 11 of the formed fastener element when the punch engages the latter to force the same against the trimming die. The periphery of the punch member extremity is so sized as to fit and shearingly pass the cutting edges 50 and enter the drop out hatch 49 of the trimming die, when the punch member is carried down into cooperative relation with the latter. Suitably affixed by a bracket support 60 to the die bed 17 so as to be spaced above the trimming die, is a horizontal stripper plate 61, having an opening 62 through which the punch member 54 reciprocates.

The trimming dies are preferably disposed side by side with the shaping dies, and when so arranged, the base 53 of the trimming punch is provided with a seating socket 63 to support the thrust spring 41, which engages the cam pin 38.

In the operation of the dies, while the chuck 18 is raised to separate the lower and upper die elements, a rod or wire R of iron or soft steel is lead from a suitable source of supply, transversely over the lower shaping die body 19, so as to lie along and over the shaping cavities thereof. When the rod or wire R is thus positioned, the press controlling the movement of the chuck 18, is actuated whereby said chuck is caused to descend to forcefully carry the upper shaping die downwardly into operative relation to the lower shaping die, and thereby nip the intermediate section of the rod or wire R, and thereupon smashing and squeezing the material thereof so that it fills the cavities 23 and 24, thus shaping therefrom the base 12 and a port or hemisphere of the head 10 and neck 11 of the desired fastener element, while at the same time squeezing the material into the lug forming cavities 29 of the upper shaping die, to shape the lugs 13 in operative projection from the base 12, and also into the cavity 30 of said upper shaping die to shape the other part or hemisphere of the head 10 and neck 11 of the desired fastener element. In this manner, at one blow, the entire fastener element is formed in all its parts as an integral solid one-piece body. The excess material of the rod or wire 11 will be squeezed outwardly therefrom in the form of a comparatively thin web W. Upon completion of the described forming operation, the chuck 18 is again raised, to separate the upper shaping die from the lower shaping die. As said upper shaping die rises, the end 42 of the cam pin 38 is carried into engagement with control cam 43, thereby moving the cam pin 38 from left to right so that its depressor cam 40 thrusts downwardly upon the plug 35, which in turn moves downwardly in the slideway 33 carrying down the knock-out pins 36, which thereby force the formed riveting lugs 13 out of the lug die cavities 29 and at the same time strip away the fastener element formation from said upper shaping die.

While the dies are separated, the rod with the shaped fastener element is shifted from left to right, thereby to position the shaped fastener element in the lower trimming die, while at the same time disposing a new portion of the rod or wire R between the shaping dies ready to be acted upon thereby. A repetition of the above described operations is now carried on to shape a succeeding fastener element. Simultaneously with the succeeding operation of the shaping dies, the trimming dies will function with respect to the first formed fastener element. In so functioning, on the descent of the chuck 18, the trimming punch will engage the first formed fastener element and will punch the same downwardly past the cutting edges 50 of the lower trimming die, thereby cutting away from the sides of the first formed fastener element the web W of excess material, so that the completed fastener element will be severed therefrom and will be discharged downwardly through the drop out hatch 49 into a suitable receiver. As the chuck 18 again rises, if the web W sticks to the trimming punch 54, it will be carried upwardly thereby into engagement stripper plate 61 which will strip it off of said punch.

The above described operations may be continuously repeated so as to rapidly and successively produce the complete fastener elements ad libitum.

After discharge from the dies, the only additional processing required is to tumble the fastener elements to smooth off burs or surface roughness preparatory to plating or other similar desired treatment.

It will be obvious from the above description, that the present invention produces a novel fastener element as a solid one-piece device out of iron or soft steel which requires neither preliminary nor intermediate annealing, nor does it require hardening, but on the other hand is ready for use either as is or as plated for appearance sake. It will also be apparent that the novel die set will produce the fastener elements complete by a single forming or shaping blow out of the original raw stock, thus eliminating many preliminary and intermediate operations heretofore necessary when making similar fastener elements of brass or like base material.

Having thus described my invention, I claim:—

1. Dies for producing fastener elements of the kind described in one-piece, comprising cooperating lower and upper shaping dies, said lower shaping die having obtusely angular faces in one of which is a fastener base shaping cavity and in the other a cavity for shaping approximately one-half of the head and neck of said fastener in angular projection from an end of the base, and said upper shaping die having corresponding inverted obtusely angular faces in one of which are cavities for shaping riveting lugs in right angular projection from the bottom plane of the fastener base and in the other a cavity for shaping the remaining portion of the head and neck of said fastener.

2. Dies for producing fastener elements of the kind described in one-piece, comprising cooperating lower and upper shaping dies, said lower shaping die having obtusely angular faces in one of which is a fastener base shaping cavity and in the other a cavity for shaping approximately one-half of the head and neck of said fastener in angular projection from an end of the base, and said upper shaping die having corresponding inverted obtusely angular faces in one of which are cavities for shaping riveting lugs in right angular projection from the bottom plane of the fastener base and in the other a cavity for shaping the remaining portion of the head and neck of said fastener, and trimming dies operative to shear away excess material from a shaped fastener element, comprising a lower trimming die having a drop-out hatch provided at its upper end with peripheral cutting edges conforming to the longitudinal peripheral shape of the fastener element, and a punch member of corresponding peripheral shape having in its face cavities to receive the head, neck and riveting lugs of the shaped fastener element.

3. Dies for producing fastener elements of the kind described in one-piece, comprising cooperating lower and upper shaping dies, said lower shaping die having obtusely angular faces in one of which is a fastener base shaping cavity and in the other a cavity for shaping approximately one-half of the head and neck of said fastener in angular projection from an end of the base, and said upper shaping die having corresponding inverted obtusely angular faces in one of which are cavities for shaping riveting lugs in right angular projection from the bottom plane of the fastener base and in the other a cavity for shaping the remaining portion of the head and neck of said fastener, and means associated with said upper shaping die for releasing the shaped fastener element therefrom, comprising a vertically movable plug, said upper shaping die having a slideway therefor, knock-out pins projecting from said plug and movable therewith relative to the riveting lug cavities of said upper shaping die, a transversely slidable cam pin mounted in said upper shaping die to operatively engage said plug, and stationary control cam means cooperative with said cam pin to actuate the same on rising movement of said upper shaping die.

4. Dies for producing fastener elements of the kind described in one-piece, comprising cooperating lower and upper shaping dies, said lower shaping die having obtusely angular faces in one of which is a fastener base shaping cavity and in the other a cavity for shaping approximately one-half of the head and neck of said fastener in angular projection from an end of the base, and said upper shaping die having corresponding inverted obtusely angular faces in one of which are cavities for shaping riveting lugs in right angular projection from the bottom plane of the fastener base and in the other a cavity for shaping the remaining portion of the head and neck of said fastener, and means associated with said upper shaping die for releasing the shaped fastener element therefrom, comprising a vertically movable plug, said upper shaping die having a slideway therefor, knock-out pins projecting from said plug and movable therewith relative to the riveting lug cavities of said upper shaping die, a transversely slidable cam pin mounted in said upper shaping die to operatively engage said cam pin to actuate the same on rising movement of said upper shaping die, and spring means for releasing said cam pin from actuating contact with said plug on descending movement of said upper shaping die.

5. Dies for producing fastener elements of the kind described in one-piece, comprising cooperating lower and upper shaping dies, said lower shaping die having obtusely angular faces in one of which is a fastener base shaping cavity and in the other a cavity for shaping approximately one-half of the head and neck of said fastener in angular projection from an end of the base, and said upper shaping die having corresponding inverted obtusely angular faces in one of which are cavities for shaping riveting lugs in right angular projection from the bottom plane of the fastener base and in the other a cavity for shaping the remaining portion of the head and neck of said fastener, and means associated with said upper shaping die for releasing the shaped fastener element therefrom, comprising a vertically movable plug, said upper shaping die having a slideway therefor, knock-out pins projecting from said plug and movable therewith relative to the riveting lug cavities of said upper shaping die, a transversely slidable cam pin mounted in said upper shaping die to operatively engage said plug, stationary control cam means cooperative with said cam pin to actuate the same on rising movement of said upper shaping die, and trimming dies operative to shear away excess material from a shaped fastener element, comprising a lower trimming die having a drop-out hatch provided at its upper end with peripheral cutting edges conforming to the longitudinal peripheral shape of the fastener element, and a punch member of corresponding peripheral shape having in its face cavities to receive the head, neck and riveting lugs of the shaped fastener element.

6. Dies for producing fastener elements of the kind described in one-piece, comprising cooperating lower and upper shaping dies, said lower shaping die having obtusely angular faces in one of which is a fastener base shaping cavity and in the other a cavity for shaping approximately one-half of the head and neck of said fastener in angular projection from an end of the base, and said upper shaping die having corresponding inverted obtusely angular faces in one of which are cavities for shaping riveting lugs in right angular projection from the bottom plane of the fastener base and in the other a cavity for shaping the remaining portion of the head and neck of said fastener, and means associated with said upper shaping die for releasing the shaped fastener element therefrom, comprising a vertically movable plug, said upper shaping die having a slideway therefor, knock-out pins projecting from said plug and movable therewith relative to the riveting lug cavities of said upper shaping die, a transversely slidable cam pin mounted in said upper shaping die to operatively engage said plug, stationary control cam means cooperative with said cam pin to actuate the same on rising movement of said upper shaping die, and spring means for releasing said cam pin from actuating contact with said plug on descending movement of said upper shaping die, and trimming dies operative to shear away excess material from a shaped fastener element, comprising a lower trimming die having a drop-out hatch provided at its upper end with peripheral cutting edges conforming to the longitudinal peripheral shape of the fastener element, and a punch member of corresponding peripheral shape having in its face cavities to receive the head, neck and riveting lugs of the shaped fastener element.

EDWARD W. SCHANTZ.